US007826557B2

(12) United States Patent
Li et al.

(10) Patent No.: US 7,826,557 B2
(45) Date of Patent: Nov. 2, 2010

(54) RETRANSMITTING METHOD AND TRANSMITTING METHOD IN MULTI-ANTENNA TRANSMISSION

(75) Inventors: Jifeng Li, Kanagawa (JP); Xiaohong Yu, Beijing (CN); Xiaoming She, Beijing (CN)

(73) Assignee: Panasonic Corporation, Osaka (JP)

( * ) Notice: Subject to any disclaimer, the term of this patent is extended or adjusted under 35 U.S.C. 154(b) by 656 days.

(21) Appl. No.: 11/721,911

(22) PCT Filed: Dec. 14, 2005

(86) PCT No.: PCT/JP2005/022982

§ 371 (c)(1),
(2), (4) Date: Jun. 15, 2007

(87) PCT Pub. No.: WO2006/064857

PCT Pub. Date: Jun. 22, 2006

(65) Prior Publication Data

US 2009/0252236 A1 Oct. 8, 2009

(30) Foreign Application Priority Data

Dec. 17, 2004 (CN) .......................... 2004 1 0104532

(51) Int. Cl.
 *H04L 27/00* (2006.01)
(52) U.S. Cl. ...................................... 375/299; 375/267
(58) Field of Classification Search .................. 375/299, 375/290, 267, 347
See application file for complete search history.

(56) References Cited

U.S. PATENT DOCUMENTS

| 7,567,625 B2 * | 7/2009 | Oh et al. ...................... 375/299 |
| 2005/0117520 A1 | 6/2005 | Miyoshi |
| 2005/0190849 A1 | 9/2005 | McNamara |

FOREIGN PATENT DOCUMENTS

| CN | 1 144424 | 3/1997 |
| CN | 2 520077 | 11/2002 |
| JP | 2004 040232 | 2/2004 |
| JP | 2004 112098 | 4/2004 |
| JP | 2005 260932 | 9/2005 |
| KR | 2004-63324 | 7/2004 |

OTHER PUBLICATIONS

Korean Office Action dated Oct. 14, 2008 with English Translation.
PCT International Search Report dated Mar. 20, 2006.
Isamu Yoshii, et al.; "MIMO Kankyo ni Okeru Antenna Rotation to TPA o Mochiita HARQ no Kento," IEICE Technical Report, Feb. 27, 2003, vol. 102, No. 669, pp. 13-16.

(Continued)

*Primary Examiner*—Kevin Y Kim
(74) *Attorney, Agent, or Firm*—Dickinson Wright PLLC

(57) ABSTRACT

A transmitting apparatus capable of enhancing the certainty of data transmission of MIMO system, improving the system throughput, and providing a retransmission technique adaptive to the multi-antenna transmission. In this apparatus, a serial/parallel converting part (300) serial/parallel converts the data, which is to be transmitted, into a number $n_T$ of data substreams. A data rearranging part (301) rearranges, based on feedback information, the $n_T$ data substreams. CRC encoding parts (302) CRC encode the respective data substreams. Modulating/encoding parts (303) modulate and encode the respective corresponding data substreams. A number $n_T$ of transmission antennas (304) transmit the data substreams.

7 Claims, 6 Drawing Sheets

OTHER PUBLICATIONS

Haitao Zheng, et al.; "Multiple Arqprocesses for MIMO Systems," In: Parsonal, Indoor and Mobile Radio Communications 2002, Sep. 18, 2002, vol. 3, pp. 1023-1026.

L.M. Davis, et al.; "System Architecture and ASICS for a MJMO 3GPP-HSDPA Receiver," In: Vehicular Technology Conference 2003, Spring, Apr. 25, 2003, vol. 2, pp. 818-822.

* cited by examiner

RETRANSMITTING METHOD AND TRANSMITTING METHOD IN MULTI-ANTENNA TRANSMISSION

TECHNICAL FIELD

The present invention relates to a retransmitting method and a transmitting apparatus in multi-antenna transmission.

BACKGROUND ART

In the next-generation wireless communication system, demands for information rates and transmission quality have further increased. Conventionally, how to use resources in the time domain and the frequency domain has been mainly studied. In recent years, with the emergence of the multi-antenna (MIMO) technique, the new direction has been given to researchers. In the MIMO system, a transmitting side transmits signals using a plurality of antennas, while a receiving side receives the signals using a plurality of antennas. As compared with the conventional single-antenna transmission scheme, the MIMO technique is capable of remarkably increasing the channel capacity and further increasing the information transmission rate. The spatial resource can be used almost endlessly as compared with the resources in the time domain and the frequency domain, and therefore the MIMO technique can overcome issues of the conventional technique, and becomes the core technique of the next-generation wireless communication system.

FIG. 1 illustrates a configuration of a typical MIMO system. In this configuration, a transmitting side and receiving side transmit and receive signals using $n_T$ or $n_R$ antennas, respectively. On the transmitting side, first, serial/parallel conversion section 101 performs serial/parallel conversion on data queued for transmission, and the data is divided into $n_T$ data streams. Each of the $n_T$ streams corresponds to a single antenna. Before transmission, modulation/encoding sections 102-1 to 102-$n_T$ modulate and encode the data sub-streams. Then, the data sub-streams are transmitted from $n_T$ antennas 103-1 to 103-$n_T$. On the receiving side, first, using $n_R$ antennas 104-1 to 104-$n_R$, all the signals in space are received. Next, based on pilot signals of received signals received in antennas 104-1 to 104-$n_R$, or using another method, channel estimation section 105 performs channel estimation, and estimates current channel characteristic matrix H. In the MIMO system, channel characteristics can be described in matrix. Then, based on channel characteristic matrix H estimated in channel estimation section 105, MIMO detection section 106 detects sub-streams by a general interference cancellation detection method, demodulates information bits transmitted from the transmitting side, and obtains original transmission data. When detecting sub-streams 1, 2, . . . , $n_T$ sequentially, MIMO detection section 106 calculates in advance equivalent SINR values (Signal to Interfering Noise Ratio) (SINR(1), SINR(1), . . . , (SINR) ($n_T$) of the detected sub-streams.

The model of the MIMO system will be described next.

$s=[s_1, \ldots, s_{nt}]^T$ is assumed to be a dimensional vector of a transmission code. si is a code transmitted from an ith antenna. A signal vector of corresponding nr×1 reception antennas is $y=[y_1, \ldots, y_{nr}]^T$, and equation 1 holds.

$$y=Hs+n \quad \text{(Equation 1)}$$

In equation 1, $n=[n_1, \ldots, n_{nr}]^T$ represents zero mean white Gaussian noise of nr reception antennas. H is an nr×nt channel matrix.

To restore transmission code s from reception vectory, it is necessary to adopt MIMO reception detection and detect the signal.

Conventional detection methods include maximum likelihood detection, ZF detection, MMSE detection and BLAST detection.

In the maximum likelihood detection method, detection can be directly derived by taking statistics of noise spread of the vector. However, the complexity of the maximum likelihood detection method exponentially increases according to the number of transmission antennas, and therefore there is a problem that implementation is difficult.

A ZF detector is capable of completely canceling interference between transmission antennas, but has a problem that background noise increases at the same time.

The basic concept of an MMSE detector is to minimize a mean square error between estimated data and actual data. Considering the influence of background noise, the MMSE detector compromises between cancellation of interference between antennas and an increase in background noise, and has the performance more excellent than that of the ZF detector.

A BLAST detector (ZF-BLAST and MMSE-BLAST) is mainly configured with a linear converter and a serial interference canceller. First, data decision at the Ith antenna having the highest signal-to-noise ratio is obtained through the linear conversion. By using the data, transmission data of the Ith antenna is reconstructed, and the influence of the code is removed from the received signal. Then, data estimation of an antenna having the highest S/N ratio among remaining data is calculated, and the interference is cancelled. This operation is repeated until all data estimations are obtained.

In the conventional mobile communication, there is a problem that radio channels are uncertain and likely to change due to a poor radio channel environment. The MIMO system has the same problem. In order to reduce the code error rate and improve the system throughput, it is necessary to adopt channel coding and error correcting technique. With the channel coding, redundant information is added to original information so as to enable a receiving side to detect and correct error information. Currently, Hybrid Automatic Repeat Request (HARQ) technique is generally used as the error correcting technique. In the Hybrid Automatic Repeat Request, based on Automatic Repeat Request (ARQ) and Forward Error Correcting technique (FEC), detection and error correction is performed. The Hybrid Automatic Repeat Request technique has three types as described below. In the first type, a receiving side discards a packet that cannot be received correctly, transmits a request for retransmitting a copy of the original packet to the transmitting side using feedback information, and decodes the newly received packet independently. In the second type, a receiving side does not discard a packet with an error, combines the packet with retransmitted information, and performs decoding. This combining is also called Soft Combining. In the third type, the retransmitted information may be combined with a previously transmitted packet, but the retransmitted packet includes all necessary information upon receiving the data correctly.

When channel error correction is performed using HARQ, the transmitting side first transmits encoded information to the receiving side, and the receiving side receives the information and performs error correction. When the information can be received correctly, the receiving side receives the information, while transmitting ACK reception information to the transmitting side. When an error cannot be corrected, the receiving side transmits NACK information and a request for retransmitting the data to the transmitting side, and decodes received retransmitted data.

However, the retransmitting method in the conventional HARQ technique adapts to a single antenna, and there is a problem that it is not possible to improve transmission reliability of the system and increase the system throughput by using the HARQ technique in a multi-antenna environment.

DISCLOSURE OF INVENTION

Problems to be Solved by the Invention

It is therefore an object of the present invention to provide a retransmitting method and transmitting apparatus in multi-antenna transmission capable of providing a retransmitting technique which can improve reliability of data transmission and the system throughput of the MIMO system, and adapts to the multi-antenna transmission.

Means for Solving the Problem

A retransmitting method in multi-antenna transmission of the present invention has the steps of: detecting reception quality of each sub-stream from a received signal; feeding back the reception quality of each sub-stream from a receiving side to a transmitting side; selecting on the transmitting side an antenna for use in retransmission on a per sub-stream basis based on the fed back reception quality of each sub-stream; and retransmitting on the transmitting side the sub-stream using a selected antenna.

A transmitting apparatus of the present invention adopts a configuration provided with: a converting section that converts transmission data into a plurality of parallel sub-streams; a data rearranging section that rearranges the parallel sub-streams converted in the converting section so that a sub-stream to be retransmitted is transmitted from an antenna different from an antenna used in last transmission; and a transmitting section that transmits the sub-streams rearranged in the data rearranging section from antennas corresponding to the sub-streams.

ADVANTAGEOUS EFFECT OF THE INVENTION

According to the present invention, it is possible to provide a retransmission technique which can improve reliability of data transmission and the system throughput of the MIMO system, and adapts to multi-antenna transmission.

BEST MODE FOR CARRYING OUT THE INVENTION

The present invention combines the HARQ technique and MIMO technique, and improves performance of the MIMO system using the HARQ technique.

Embodiment 1

Figure 1:
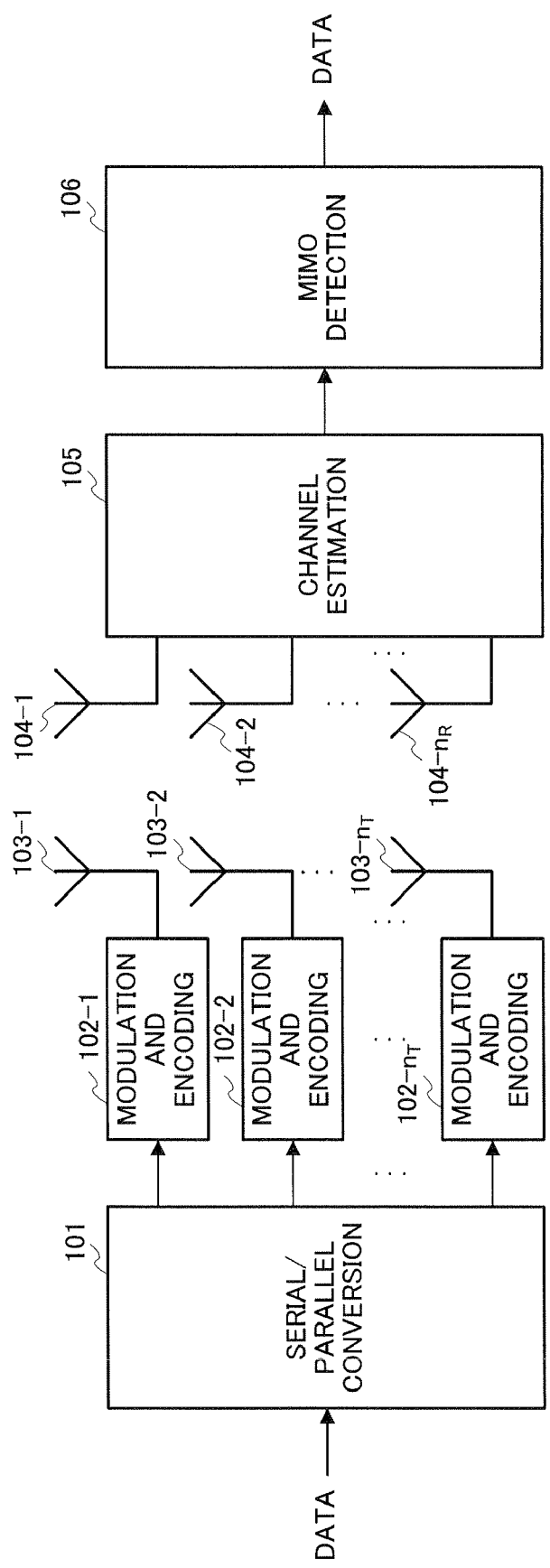
FIG. 1 is a block diagram showing a configuration of a typical MIMO system.
Figure 2:
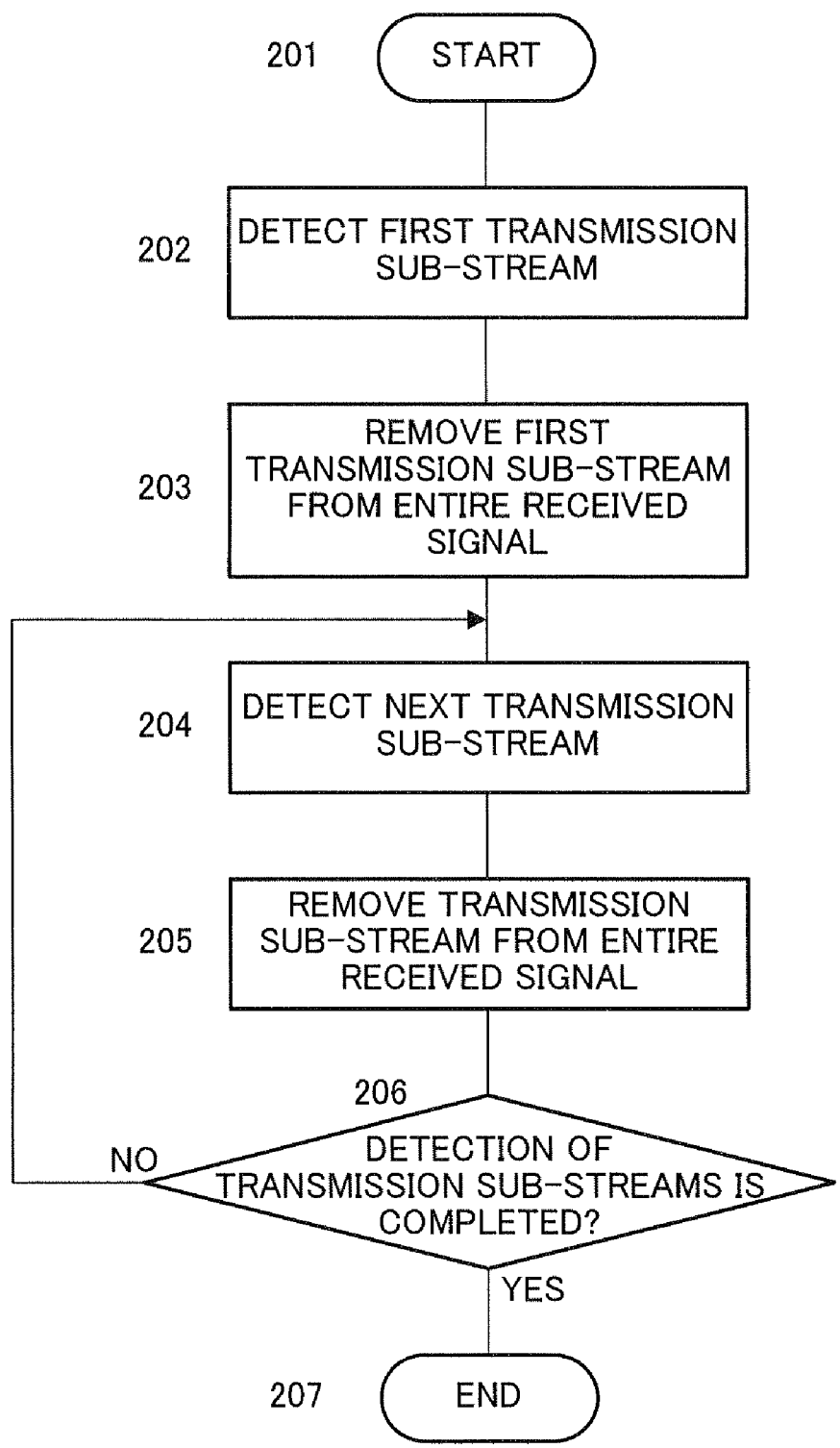
FIG. 2 is a flowchart illustrating an SIC detection method.

FIG. 2 is a flowchart illustrating an SIC detection method in Embodiment 1.

In step 201, detection starts. In step 202, based on current channel characteristic matrix H, a first transmission sub-stream is detected from the entire received signal using detector ZF or MMSE. When the sub-stream is detected, in step 203, the influence of the first transmission sub-stream is removed from the entire received signal.

Next, in step 204, in the received signal from which the transmission sub-stream is removed, the next transmission sub-stream is detected again using the detector. When the sub-stream is detected, in step 205, the influence of the transmission sub-stream is removed from the entire received signal. Then, in step 206, it is judged whether detection of transmission sub-streams is completed or not.

When it is judged that detection of sub-streams is not completed in step 206, the flow returns to step 204, and detection continues. Until the $n_T$th sub-stream is detected, the above-described procedures are repeated. When detection of all the sub-streams is completed, detection is finished in step 207.

Figure 3:
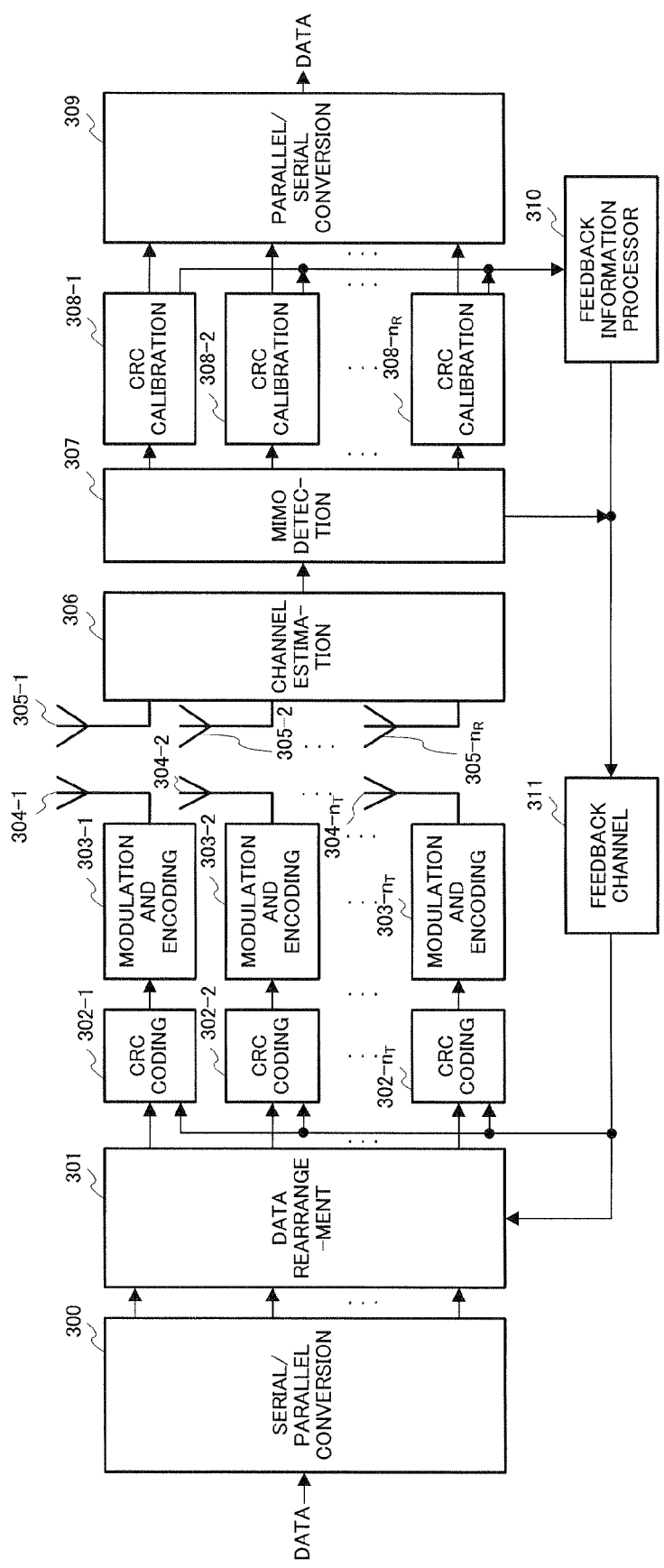
FIG. 3 is a block diagram showing a configuration of a MIMO system of a HARQ technique according to Embodiment 1 of the present invention.

FIG. 3 is a block diagram showing a configuration of a MIMO system of a HARQ technique according to Embodiment 1 of the present invention;

In this configuration, a transmitting side and receiving side transmit and receive signals using $n_T$ antennas and $n_R$ antennas, respectively. On the transmitting side, first, serial/parallel conversion section 300 which is a converting means performs serial/parallel conversion on data queued for transmission and divide the data into $n_T$ data sub-streams. Data rearranging section 301 rearranges $n_T$ data sub-streams based on feedback information. CRC encoding sections 302-1 to 302-$n_T$ perform CRC encoding on the sub-streams. Each of the sub-streams corresponds to a single transmission antenna and a single independent ARQ process. Then, modulation/encoding sections 303-1 to 303-$n_T$ modulate and encode corresponding data sub-streams, and $n_T$ transmission antennas 304-1 to 304-$n_T$ transmit the data sub-streams.

On the receiving side, first, $n_R$ antennas 305-1 to 305-$n_R$ receive all the signals in space. Next, based on pilot signals of received signals or using another method, channel estimation section 306 performs channel estimation, and estimates current channel characteristic matrix H. Then, based on channel characteristic matrix H, MIMO detection section 307 which is a sub-stream detecting means detects sub-streams by a general interference cancellation detection method, and obtains equivalent SINR values of the detected sub-streams. The information of these equivalent SINR values is fed back to the transmitting side by feedback channel 311 as reception quality information. CRC calibration sections 308-1 to 308-$n_R$ perform CRC calibration on detected data sub-streams, and transmit calibration results to feedback information processor 310. Feedback information processor 310 generates feedback information of the sub-streams and feedback to the transmitting side through feedback channel 311.

When data has an error, and detection is performed according to the fixed detection order, it is determined which antenna is to be used to transmit the data, based on the SINR values of the sub-streams obtained on the transmitting side.

A detection method based on SIC (Serial Interference Cancellation) is adopted for sub-stream detection. The basic concept of SIC detection is to detect a given transmission sub-stream using a detector (for example, a detector of the maximum likelihood detection method, a detector of the MMSE (Minimum Mean Square Error) detection method, or a detector of the ZF (ZERO FORCING) detection method), remove the influence of the sub-stream from the entire received signal, detect the next sub-stream, and thus repeat detection until all the sub-streams are detected.

A point to explain herein is that the detection performed herein does not intend to obtain a final sub-stream, but is to confirm SINRs of the transmission sub-streams detected using this method. After the detection is finished, based on channel characteristic matrix H, the detector used in each detection step and an estimation value of channel noise, it is possible to readily calculate equivalent SINR values (SINR (1), SINR(1), . . . , (SINR)($n_T$)) of the detected sub-streams. The estimation value of channel noise is calculated based on the received signal which is a multiplex of a useful signal and noise, and the power of the useful signal is known, and therefore the channel noise can be calculated from the received signal.

MIMO detection is performed according to the fixed sub-stream detection order. For example, in ascending order of transmission antennas 1 to $n_T$, SIC detection and SINR calculation is performed on the sub-streams. At the same time, for MIMO detection, detection of sub-streams is performed sequentially in the same order, and final data is obtained.

The equivalent SINRs obtained by detecting sub-streams are transmitted to the transmitting side using the feedback channel. At the same time, error correction is performed on the final data obtained by detecting sub-streams, and, when the data is not received correctly, a request for retransmission is transmitted to the transmitting side. Based on the equivalent SINR values of the sub-streams, the transmitting side selects and determines an antenna to retransmit the data. The principles in selecting an antenna is that, when the SINR value of an antenna used upon the first transmission is high, an antenna with a low SINR value is selected upon retransmission, and, when the SINR value of an antenna used upon the first transmission is low, an antenna with a high SINR value is selected upon retransmission. For example, the SINR value of the used antenna is compared with a threshold upon the first transmission, and, upon the second transmission, data with the SINR value less than the threshold is retransmitted from an antenna that transmits the data with the SINR value more than or equal to the threshold.

Further, when the number of transmission antennas is $n_T$, a given data sub-stream cannot be received correctly, and the equivalent SINR value of the data sub-stream is the Lth (when the data sub-streams are arranged in ascending order of SINR values) in the data sub-streams, an antenna with the SINR value of the $n_T$−L+1th is selected to perform retransmission upon retransmission. For example, it is assumed that the number of transmission antennas is four, and the order of equivalent SINR values upon the first data transmission is 3, 1, 4 and 2 (in ascending order). In other words, the order of the SINR value of the first antenna is third in the four antennas, and the order of the SINR value of the second antenna is the smallest in the four antennas. On the receiving side, when data of the third antenna cannot be received correctly and retransmission is required, by $n_T$−L+1=4−4+1=1, using an antenna with the SINR value of the first order upon retransmission—using the second antenna—, retransmission is performed. According to this method, it is possible to bring the SINR values of the received data sub-streams close to balanced values, and improve the mean error code rate performance of the system.

Figure 4:
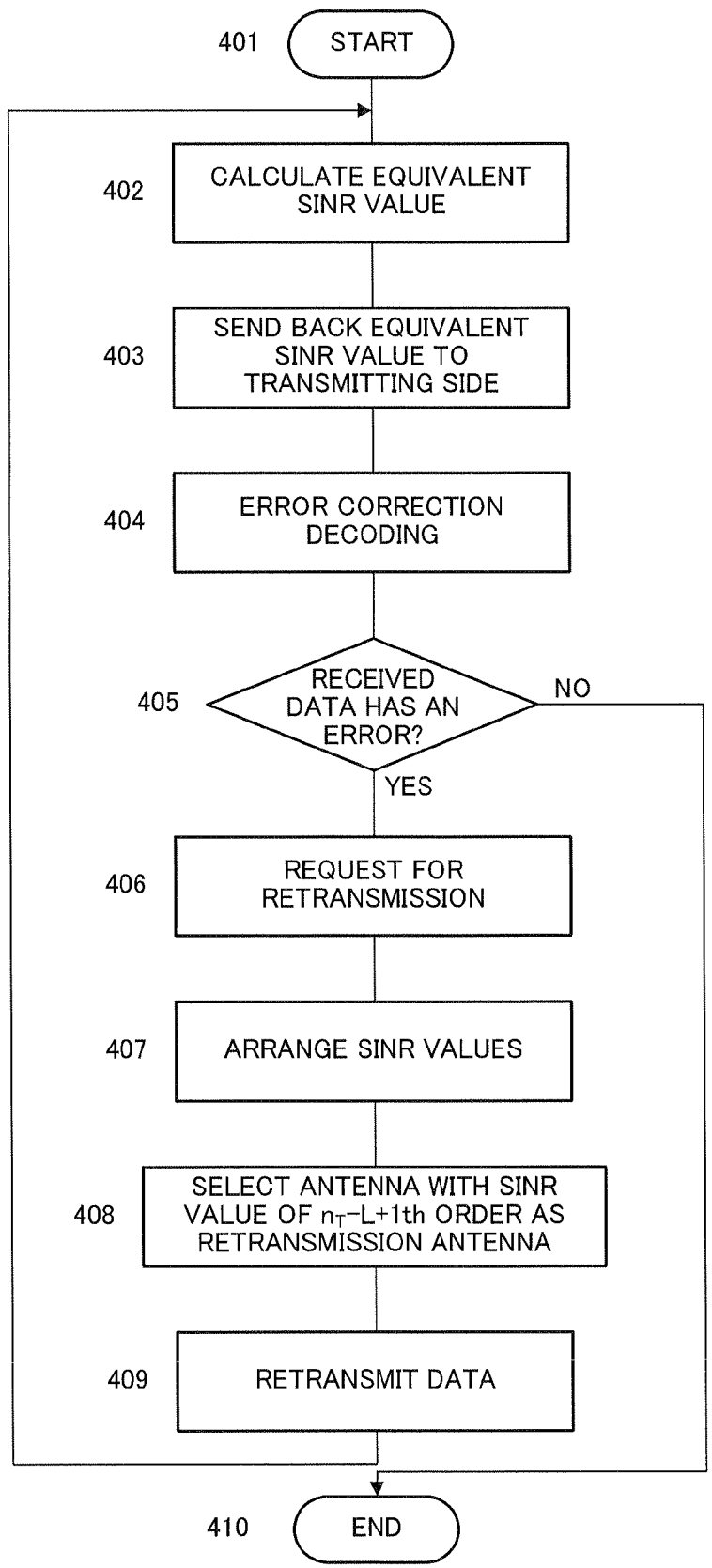
FIG. 4 is a flowchart illustrating a retransmission process using a fixed detection order according to Embodiment 1 of the present invention.

FIG. 4 is a flowchart illustrating retransmission process according to a fixed detection order of the present invention.

In FIG. 4, the flow starts in step 401, and the receiving side calculates equivalent SINR values of the detected sub-streams received on the receiving side in step 402, and returns the equivalent SINR values of the detected sub-streams to the transmitting side in step 403. Successively, the receiving side performs error correction decoding on the detected data in step 404, and judges whether or not the data received at a single or a plurality of antennas has an error in step 405. When judging that the error exists in step 405, the receiving side transmits a request for retransmitting the data to the transmitting side in step 406.

When the received data does not have an error, retransmission is not necessary, and the flow is finished in step 410. When the data is retransmitted, it is necessary to rearrange equivalent SINR values of data sub-streams sent back to the receiving side in ascending or descending order in step 407.

In step 408, when the order of the SINR value of a data sub-stream with an error is Lth, and the number of all the transmission streams is $n_T$, an antenna with the SINR value of the $n_T$−L+1th order is selected as a retransmission antenna, and the data which had an error is retransmitted in step 409.

Then, the detection flow is continued on the receiving side, and, when the data is received correctly, the flow is finished in step 410. When the data is not received correctly, retransmission of the data is continued. In addition, for each of $n_T$ and $n_R$ antennas, independent redundant check coding and Auto Repeat Request may be performed.

Thus, according to Embodiment 1, an antenna for use in transmission changes based on the equivalent SINR upon retransmission of a data sub-stream, so that it is possible to provide the retransmission technique which can improve reliability of data transmission and the system throughput of the MIMO system, and adapts to multi-antenna transmission.

Embodiment 2

Figure 5:
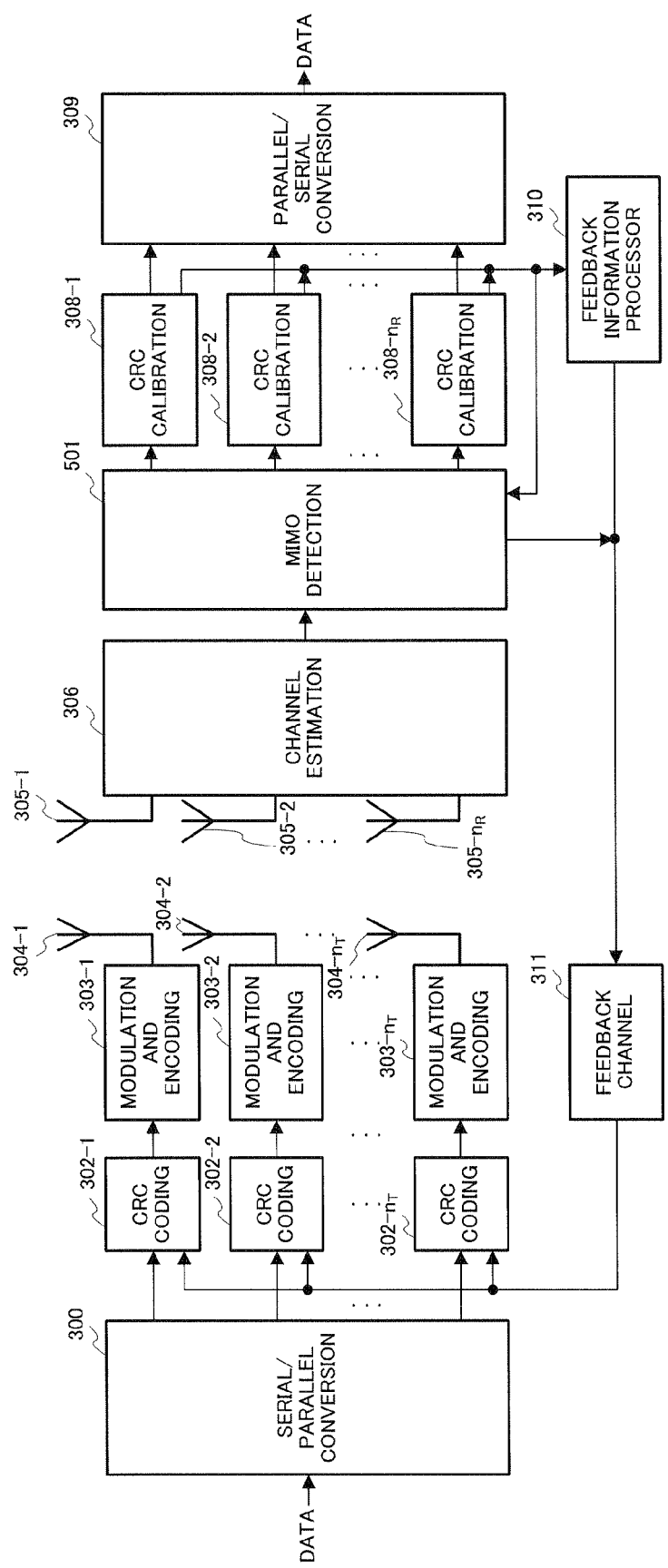
FIG. 5 is a block diagram showing a MIMO system of the HARQ technique according to Embodiment 2 of the present invention.

FIG. 5 is a block diagram showing the MIMO system of the HARQ technique according to Embodiment 2 of the present invention. As shown in FIG. 5, the MIMO system of the HARQ technique according to Embodiment 2 removes data rearranging section 301, and has MIMO detection section 501 in place of MIMO detection section 307 in the MIMO system of the HARQ technique according to Embodiment 1 shown in FIG. 3. In addition, in FIG. 5, components that are the same as those in FIG. 3 will be assigned the same reference numerals without further explanations. Further, an SIC detection method in Embodiment 2 is the same as in FIG. 2, and descriptions thereof are omitted.

MIMO detection section 501 selects the detection order different from the detection order of last reception upon retransmission of a data sub-stream, and detects data sub-streams.

When the data has an error and detection is performed in the variable detection order on the receiving side, data which had an error is transmitted from a first used antenna. Then, CRC calibration sections 308-1 to 308-$n_R$ perform CRC calibration on the data, the correctly received data is processed in serial/parallel conversion section 309, and final data is obtained.

When MIMO detection is performed in the fixed sub-stream detection order, severe error code propagation arises. The error code propagation means that in SIC detection, a transmission sub-stream is detected for each layer, and, when detection of a last sub-stream is not performed correctly, the error propagates on a per layer basis. The error code propagation results in rapid deterioration of the BER performance of the system. Meanwhile, by the influence of Diversity Order, the Diversity Order of a subsequently detected sub-stream is high, and therefore the performance of a subsequently detected signal is higher than the performance of a previously detected signal. By the influences of both the error code propagation and Diversity Order, the detection order substantially affects the detection result. Depending on that the detection is performed early or later, different detected SINRs are obtained for the same transmission sub-stream. In other words, the detection order of sub-streams affects the SINRs of the detected sub-streams. Therefore, the SINRs of the detected sub-streams can be improved by optimizing the sub-streams, and therefore it is also possible to improve the BER performance of the system.

Figure 6:
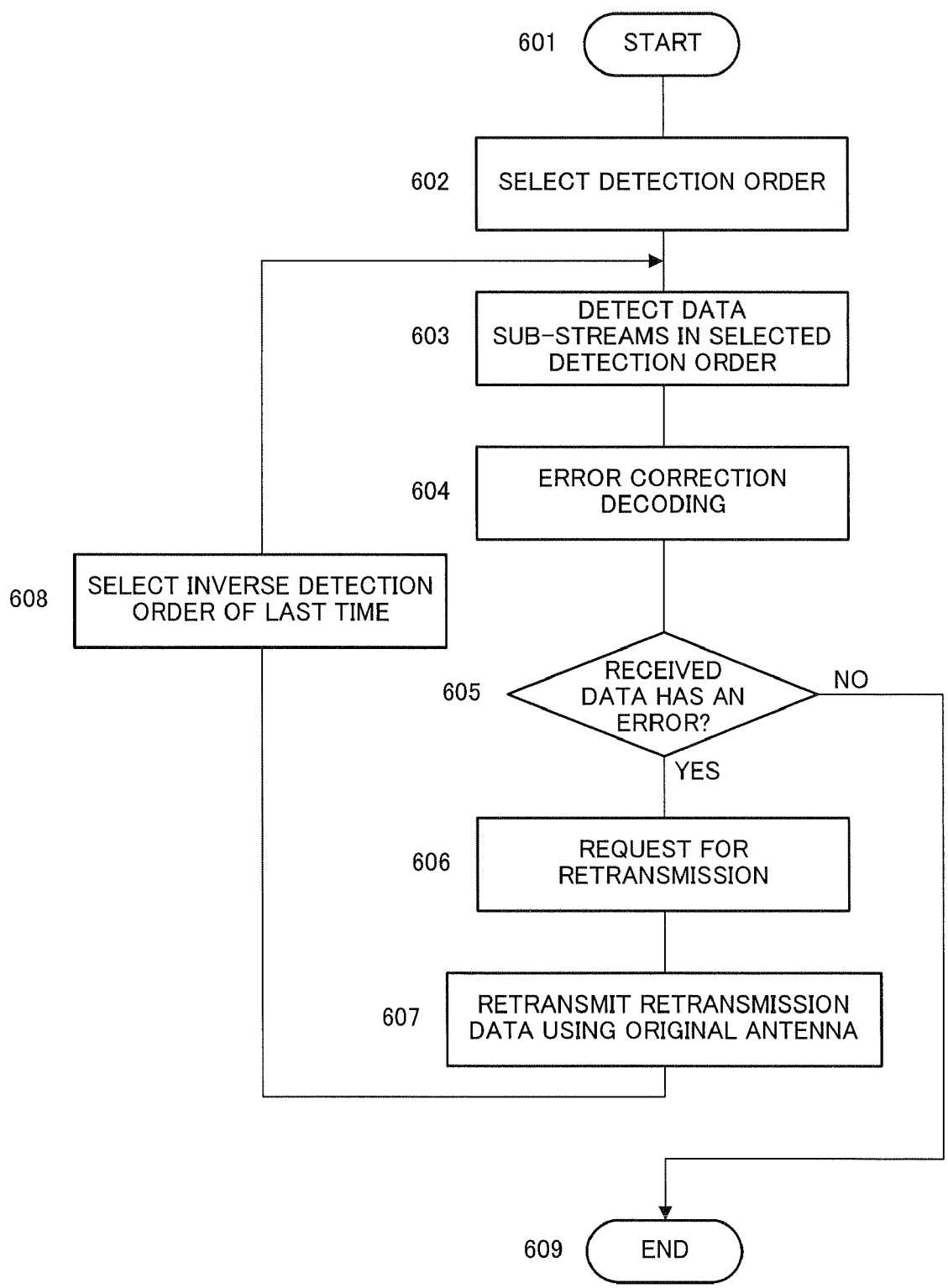
FIG. 6 is a flowchart illustrating a retransmission process using a variable detection order according to Embodiment 2 of the present invention.

FIG. 6 is a flowchart illustrating a retransmission process using a variable detection order according to Embodiment 2.

In FIG. 6, the flow starts in step 601. The receiving side selects a predetermined detection order in step 602, and, for example, the order is 3, 2, 1 and 4. Then, data sub-streams are detected according to the selected detection order in step 603.

After the sub-streams are detected, error correction decoding is performed in step 604 on the data of the sub-streams obtained by the detection, and it is judged in step 605 whether or not the data of the sub-streams has an error.

When it is judged that the data does not have an error, the flow is finished in step 609. When it is judged that the data has an error, a request for retransmitting the data sub-stream which had an error is transmitted to the transmitting side in step 606. Then, the data sub-stream which had an error is retransmitted from the same antenna as the last used antenna in step 607.

Then, in step 608, the receiving side receives the retransmitted data sub-stream, selects the inverse detection order of the last detection order, in other words, when detection is performed in the order of 3, 2, 1 and 4 (which are numbers of the antennas are selected in the order of 4, 1, 2 and 3 at this time. Then, the flow returns to step 604, and the subsequent operation is continued until the correct data is detected.

In step 608, the receiving side may select a random detection order. In other words, the random order is selected except the order of 3, 2, 1 and 4 and re-detection is performed. According to this method, it is possible to obtain the similar effect of balancing the SINR values of the data sub-streams.

When the receiving side performs detection in a variable detection order, transmission is performed using the first used antenna, and the receiving side changes the original detection order upon performing MIMO detection. There are various methods of changing the detection order. One is to perform detection in an inverse order of the original order, and further, there is a method of performing detection in a random detection order. In the first method, when the first detection order is 1, 2, 3 and 4, detection may be performed in the order of 4, 3, 2 and 1 for the second time, and the order of 1, 2, 3 and 4 may be used continuously upon the next transmission. According to this method, it is possible to obtain the similar effect of balancing the data sub-streams. In the random detection order, detection may be performed in the detection order of 1, 2, 3 and 4 for the first time, in the detection order of 3, 1, 2 and 4 for the second time, and in the detection order of 4, 1, 2 and 3 for the third time.

Thus, according to Embodiment 2, the order of detecting data sub-streams changes from the order in last reception upon retransmitting a data sub-stream, so that it is possible to provide the retransmission technique which can improve reliability of data transmission and the system throughput of the MIMO system, and adapts to the multi-antenna transmission.

In addition, in Embodiment 2, data which had an error is retransmitted using the first used antenna, but the present invention is not limited to this. By applying Embodiment 2 to Embodiment 1, a transmission antenna may be changed upon retransmission.

Above-described Embodiments 1 and 2 are not intended to limit the present invention, and are of one aspect of the invention. The present invention can be readily applied to different types of facilities. Similarly, descriptions in above-described Embodiments 1 and 2 of the present invention are not intended to limit the scope of claims, are described for explanation, and may be given various substitutions and modifications by those skilled in the art.

INDUSTRIAL APPLICABILITY

The retransmitting method and transmitting apparatus in multi-antenna transmission according to the present invention is suitable particularly for use in multi-antenna transmission.

The invention claimed is:

1. A retransmitting method in multi-antenna transmission, comprising the steps of:
   detecting reception quality of each sub-stream from a received signal;
   feeding back the reception quality of each sub-stream from a receiving side to a transmitting side;
   selecting, on the transmitting side, an antenna for use in retransmission on a per sub-stream basis, based on the fed back reception quality of each sub-stream; and
   retransmitting, on the transmitting side, a sub-stream using the antenna selected on a per sub-stream basis, wherein:
   the reception quality of each sub-stream is detected by detecting the each sub-stream from the received signal using a current channel characteristic matrix and a predetermined detector, and by calculating a signal to interference noise ratio of each sub-stream based on the channel characteristic matrix, the predetermined detector and an estimation value of channel noise.

2. A retransmitting method in multi-antenna transmission, comprising the steps of:
   detecting reception quality of each sub-stream from a received signal;
   feeding back the reception quality of each sub-stream from a receiving side to a transmitting side;
   selecting, on the transmitting side, an antenna for use in retransmission on a per sub-stream basis, based on the fed back reception quality of each sub-stream; and
   retransmitting, on the transmitting side, a sub-stream using the antenna selected on a per sub-stream basis, wherein:
   the transmitting side selects an antenna that has transmitted a sub-stream having the fed back reception quality upon last transmission equal to or more than a threshold, as the antenna for use upon retransmitting the sub-stream.

3. A retransmitting method in multi-antenna transmission, comprising the steps of:
   detecting reception quality of each sub-stream from a received signal;
   feeding back the reception quality of each sub-stream from a receiving side to a transmitting side;
   selecting, on the transmitting side, an antenna for use in retransmission on a per sub-stream basis, based on the fed back reception quality of each sub-stream; and
   retransmitting, on the transmitting side, a sub-stream using the antenna selected on a per sub-stream basis, wherein:
   antenna having an $(n_T-L+1)$th fed back reception quality upon last transmission is selected as an antenna for retransmitting a sub-stream having an Lth $(1 \leq L \leq n_T)$ fed back reception quality upon last transmission among sub-streams transmitted from $n_T$ ($n_T \geq 2$) antennas.

4. The retransmitting method in multi-antenna transmission according to claim 1, wherein the predetermined detector is any one of a maximum likelihood detector, a zero forcing detector and a minimum mean square error detector.

5. A retransmitting method in multi-antenna transmission, comprising the steps of:
   detecting reception quality of each sub-stream from a received signal;
   feeding back the reception quality of each sub-stream from a receiving side to a transmitting side;
   selecting, on the transmitting side, an antenna for use in retransmission on a per sub-stream basis, based on the fed back reception quality of each sub-stream; and
   retransmitting, on the transmitting side, a sub-stream using the antenna selected on a per sub-stream basis;
   receiving, on the receiving side, the sub-stream retransmitted from the transmitting side, using an antenna corresponding to each sub-stream; and
   sequentially detecting, on the receiving side, sub-streams received using the corresponding antenna, in a fixed order of antennas, wherein:
   independent redundant check coding and independent automatic repeat request are performed on a single antenna on the transmitting side and the receiving side.

6. A transmitting apparatus comprising:
   a converting section that converts transmission data into a plurality of parallel sub-streams;
   a data rearranging section that rearranges the plurality of parallel sub-streams converted by in the converting section, such that each sub-stream to be retransmitted is transmitted from an antenna that is different from an antenna used in last transmission and that has transmitted a sub-stream having reception quality upon last transmission equal to or more than a threshold; and
   a transmitting section that transmits the sub-streams rearranged by the data rearranging section, from antennas corresponding to the sub-streams.

7. A transmitting apparatus comprising:
   a converting section that converts transmission data into a plurality of parallel sub-streams;
   a data rearranging section that rearranges the plurality of parallel sub-streams converted by the converting section, such that each sub-stream to be retransmitted is transmitted from an antenna that is different from an antenna used in last transmission; and
   a transmitting section that transmits the sub-streams rearranged by the data rearranging section from antennas corresponding to the sub-streams, wherein:
   the data rearranging section rearranges the plurality of parallel sub-streams, such that a sub-stream having an Lth ($1 \leq L \leq n_T$) signal to interference noise ratio at a communicating party upon last transmission, among sub-streams transmitted from $n_T$ ($n_T \geq 2$) antennas, is transmitted from an antenna that has transmitted a sub-stream having an ($n_T-L+1$)th signal to interference noise ratio at the communicating party upon last transmission.

* * * * *